(12) United States Patent
Samojeden et al.

(10) Patent No.: US 10,910,814 B2
(45) Date of Patent: Feb. 2, 2021

(54) SYSTEM AND METHOD FOR CONTROLLING AN ELECTRICAL RECEPTACLE BASED ON OPERATIONAL PROFILE

(71) Applicant: Hubbell Incorporated, Shelton, CT (US)

(72) Inventors: Matthew Samojeden, Rye, NY (US); Robert Simon, Shelton, CT (US); Douglas Hamilton, Arlington Heights, IL (US); David Lutz, Woodbridge, CT (US); Joseph DeBartolo, North Stonington, CT (US)

(73) Assignee: Hubbell Incorporated, Shelton, CT (US)

( * ) Notice: Subject to any disclaimer, the term of this patent is extended or adjusted under 35 U.S.C. 154(b) by 304 days.

(21) Appl. No.: 15/980,006

(22) Filed: May 15, 2018

(65) Prior Publication Data
US 2018/0331530 A1   Nov. 15, 2018

Related U.S. Application Data

(60) Provisional application No. 62/506,147, filed on May 15, 2017.

(51) Int. Cl.
| | |
|---|---|
| *H02H 1/00* | (2006.01) |
| *H02H 3/38* | (2006.01) |
| *H02H 3/00* | (2006.01) |
| *H02H 3/50* | (2006.01) |
| *H02H 3/44* | (2006.01) |
| *H04L 29/08* | (2006.01) |
| *H02H 3/20* | (2006.01) |

(52) U.S. Cl.
CPC ........ *H02H 1/0092* (2013.01); *H02H 1/0007* (2013.01); *H02H 3/006* (2013.01); *H02H 3/38* (2013.01); *H02H 3/50* (2013.01); *H02H 3/20* (2013.01); *H02H 3/44* (2013.01); *H04L 67/125* (2013.01)

(58) Field of Classification Search
CPC ........ H02H 1/0092; H02H 3/50; H02H 3/006; H02H 3/38; H02H 1/0007; H02H 3/20; H02H 3/44; H04L 67/125
See application file for complete search history.

(56) References Cited

U.S. PATENT DOCUMENTS

| | | | |
|---|---|---|---|
| 7,657,763 B2 | 2/2010 | Nelson et al. | |
| 9,836,069 B1 * | 12/2017 | Nelmes | G05B 15/02 |
| 10,401,431 B1 * | 9/2019 | Schmidt, III | H02G 3/081 |
| 10,540,528 B1 * | 1/2020 | Schmidt, Jr. | G06K 7/10366 |

(Continued)

OTHER PUBLICATIONS

PCT/US2018/032682 International Search Report and Written Opinion dated Aug. 3, 2018 (16 pages).

*Primary Examiner* — Kyle J Moody
(74) *Attorney, Agent, or Firm* — Michael Best & Friedrich, LLP (57) ABSTRACT

A receptacle including an electronic processor configured to receive information from an external load and determine, from the information, an operation profile of the external load. The electronic processor analyzes a present operation of the external load and discontinues power to the external load when a present operation of the external load differs from the operational profile.

15 Claims, 5 Drawing Sheets

(56) References Cited

U.S. PATENT DOCUMENTS

| | | | |
|---|---|---|---|
| 2005/0184856 A1* | 8/2005 | Pourchot | H01R 13/7038 340/5.61 |
| 2006/0250277 A1* | 11/2006 | Colak | G08G 1/04 340/932.2 |
| 2008/0018484 A1 | 1/2008 | Sager | |
| 2010/0257348 A1 | 10/2010 | Sovela et al. | |
| 2012/0323510 A1 | 12/2012 | Bell et al. | |
| 2017/0063126 A1 | 3/2017 | Haebler et al. | |

* cited by examiner

SYSTEM AND METHOD FOR CONTROLLING AN ELECTRICAL RECEPTACLE BASED ON OPERATIONAL PROFILE

RELATED APPLICATIONS

This application claims the benefit to U.S. Provisional Patent Application No. 62/506,417, filed on May 15, 2017, the entire contents of which are incorporated herein by reference.

FIELD

Embodiments relate to electrical receptacles.

SUMMARY

Electrical receptacles, such as arc fault circuit interrupters (AFCI) receptacles or ground fault circuit interrupters (GFCI) receptacles, are configured to provide electrical power to an external load via an outlet. AFCI and GFCI receptacle may be configured to trip when an abnormal condition (for example, an abnormal condition of an external load receiving power from the receptacle) is detected. However, various external loads receiving power from AFCI and GFCI receptacles may have different operational profiles, which may be detected as abnormal conditions, and thus lead to improper trips of the AFCI and GFCI receptacles.

Thus, one embodiment provides a receptacle including an electronic processor configured to receive information from an external load and determine, from the information, an operation profile of the external load. The electronic processor analyzes a present operation of the external load and discontinues power to the external load when a present operation of the external load differs from the operational profile.

Another embodiment provides a method of operating a receptacle. The method includes receiving, at an electronic processor, information from an external load and determining, from the information, an operation profile of the external load. The method further includes analyzing, with the electronic processor, a present operation of the external load and discontinuing power to the external load when a present operation of the external load differs from the operational profile.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
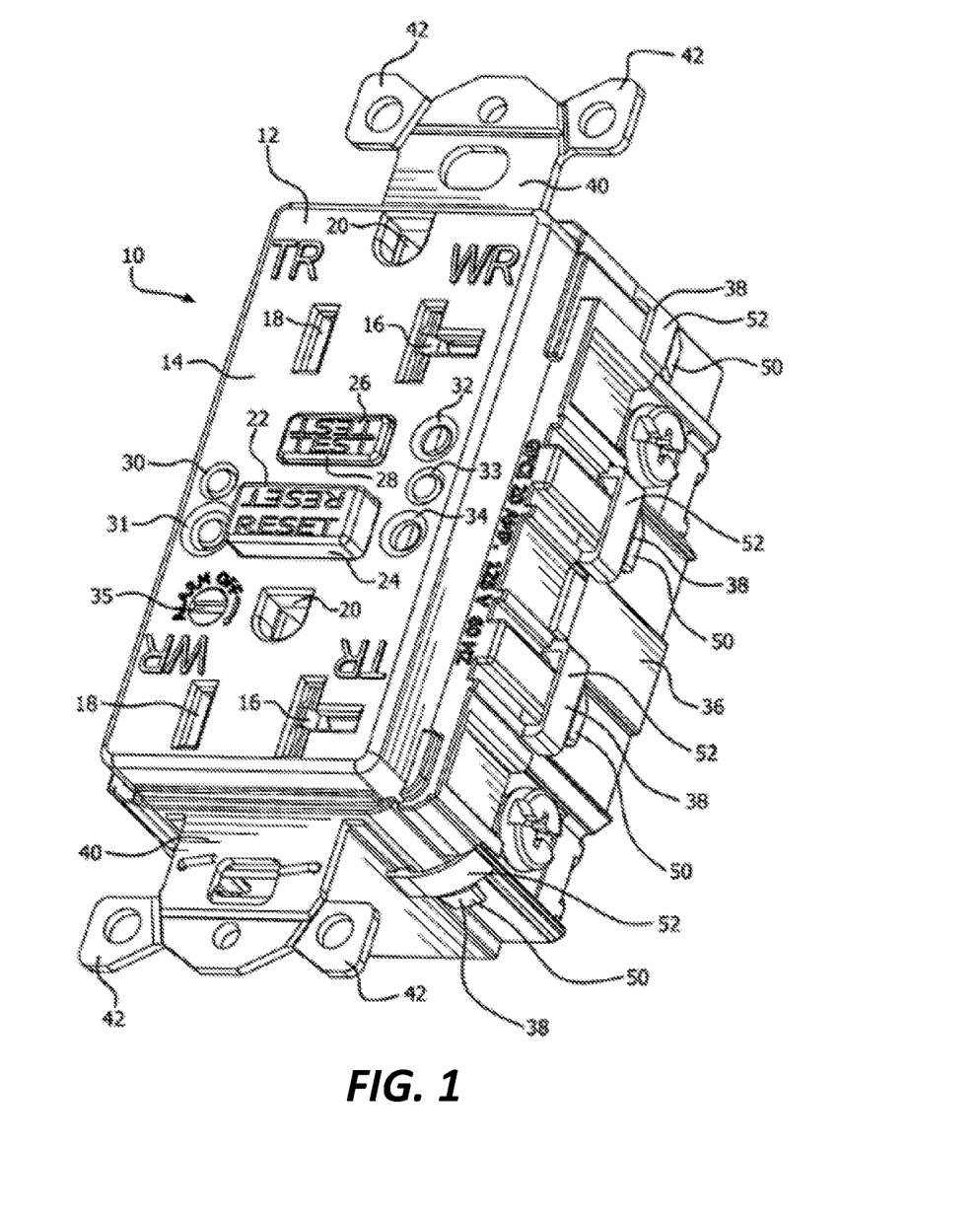
FIG. 1 is a perspective view of an electrical receptacle according to some embodiments.

FIG. 1 illustrates a perspective view of a receptacle 10 according to one embodiment of the application. In some embodiments, the receptacle 10 is an arc fault circuit interrupter (AFCI) device or a ground circuit interrupter (GFCI) device. In other embodiments, the receptacle 10 is a receptacle configured to provide 120 VAC and/or 220 VAC. In some embodiments, the receptacle 10 may include a Universal Serial Bus (USB) outlet or other direct current (DC) outlet.

The receptacle 10 includes a front cover 12 having a duplex outlet face 14 with a phase opening 16, a neutral opening 18, and a ground opening 20. The face 14 further has opening 22, accommodating a RESET button 24, an adjacent opening 26, accommodating a TEST button 28, and six respective circular openings 30-35. In some embodiments, openings 30 and 33 accommodate two respective indicators, such as but not limited to, various colored light-emitting diodes (LEDs). In some embodiments, openings 32 and 34 accommodate respective bright LEDs used, for example, as a nightlight. In some embodiments, opening 31 accommodates a photoconductive photocell used, for example, to control the nightlight LEDs. In some embodiments, opening 35 provides access to a set screw for adjusting a photocell device or a buzzer (e.g., buzzer 605 described in more detail below) in accordance with this, as well as other, embodiments.

The receptacle 10 further includes a rear cover 36 secured to the front cover 12 by eight fasteners 38 (four fasteners 38 are shown in FIG. 1, while the other four fasteners 38 are obstructed from view). In some embodiments, the fasteners 38 include a barbed post 50 on the front cover 12 and a corresponding resilient hoop 52 on the rear cover 36, similar to that which is described in detail in U.S. Pat. No. 6,398,594, the entire contents of which are incorporated herein by reference for all that is taught. A ground yoke/bridge assembly 40 includes standard mounting ears 42 protruding from the ends of the receptacle 10.

Figure 2:
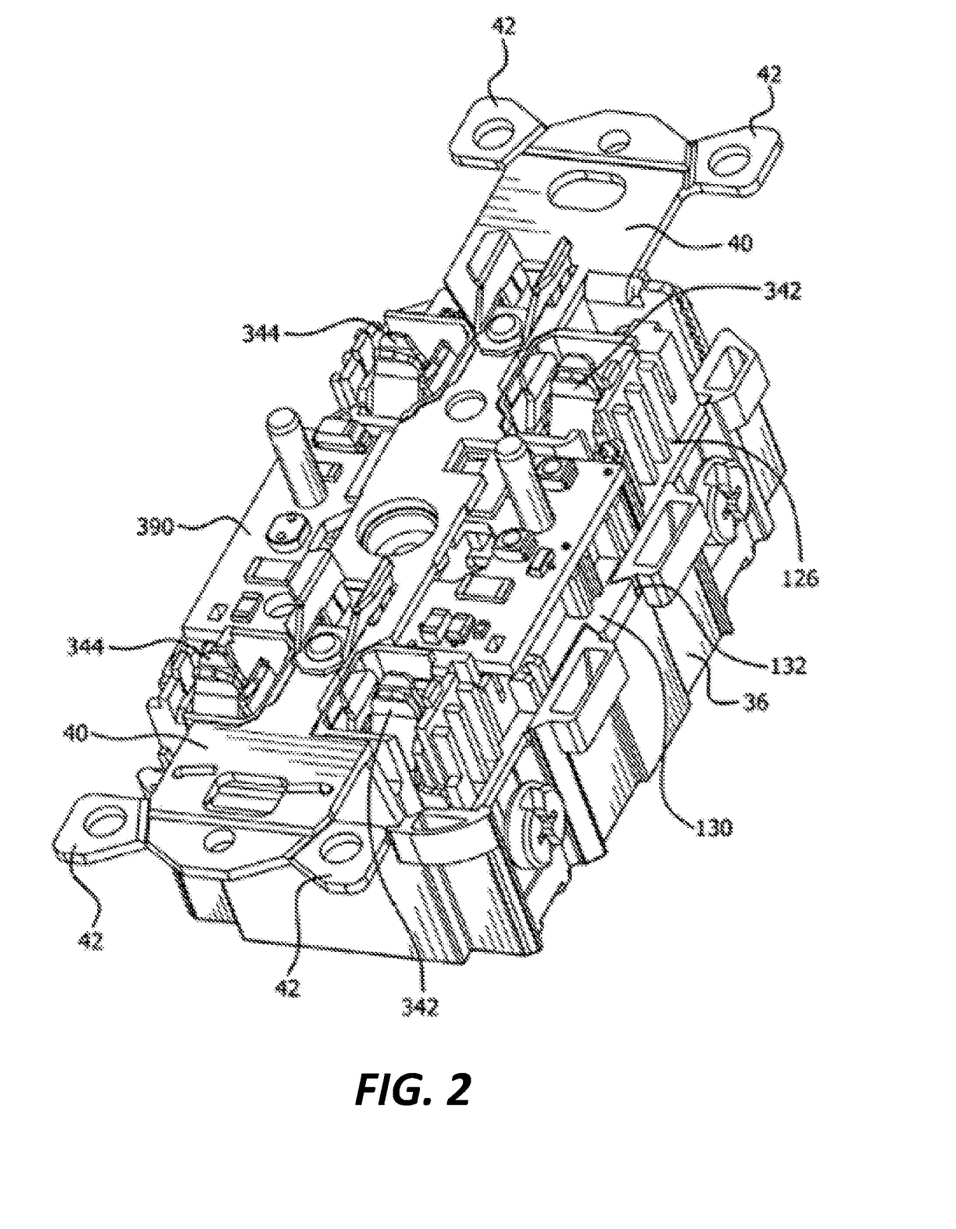
FIG. 2 is a partially exposed view of the electrical receptacle of FIG. 1 according to some embodiments.

FIG. 2 illustrates a perspective view of the receptacle 10 with the front cover 12 removed to expose manifold 126. Manifold 126 provides support for a printed circuit board 390 and the yoke/bridge assembly 40. According to one embodiment, manifold 126 includes four dovetail interconnects 130 that mate with corresponding cavities 132 along an upper edge of the rear cover 36. One dovetail-cavity pair is provided on each of the four sides of manifold 126 and rear cover 36, respectively.

Figure 3:
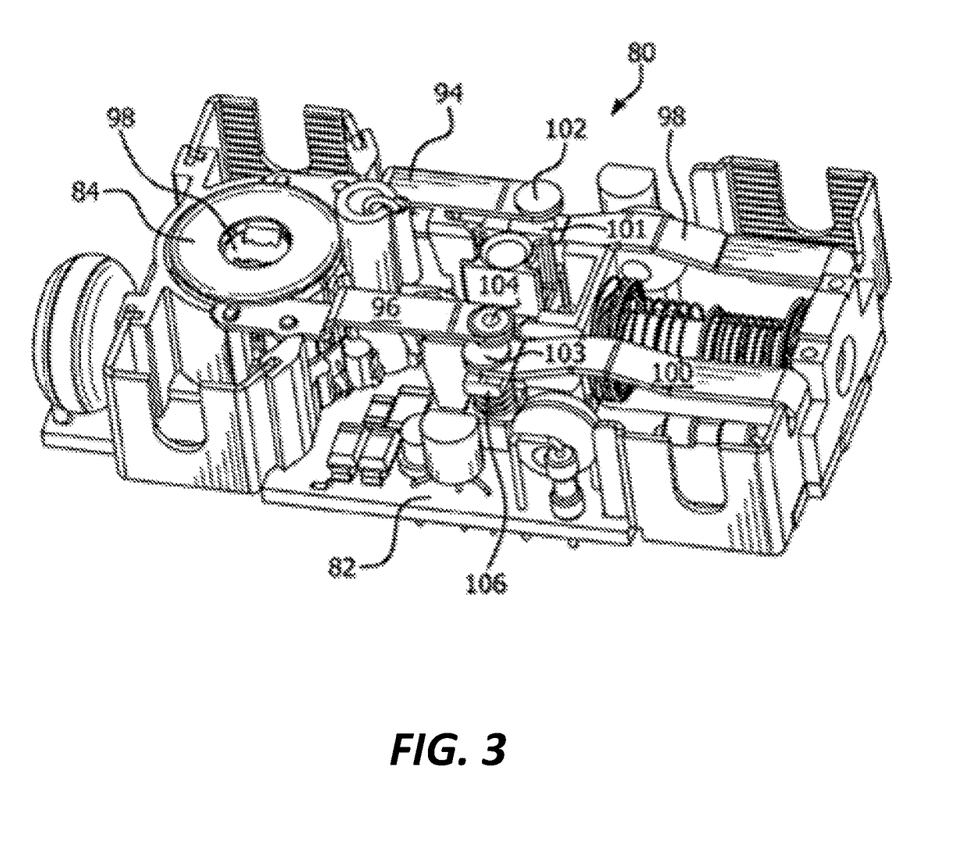
FIG. 3 is a partially exposed view of the electrical receptacle of FIG. 1 according to some embodiments.
Figure 4:
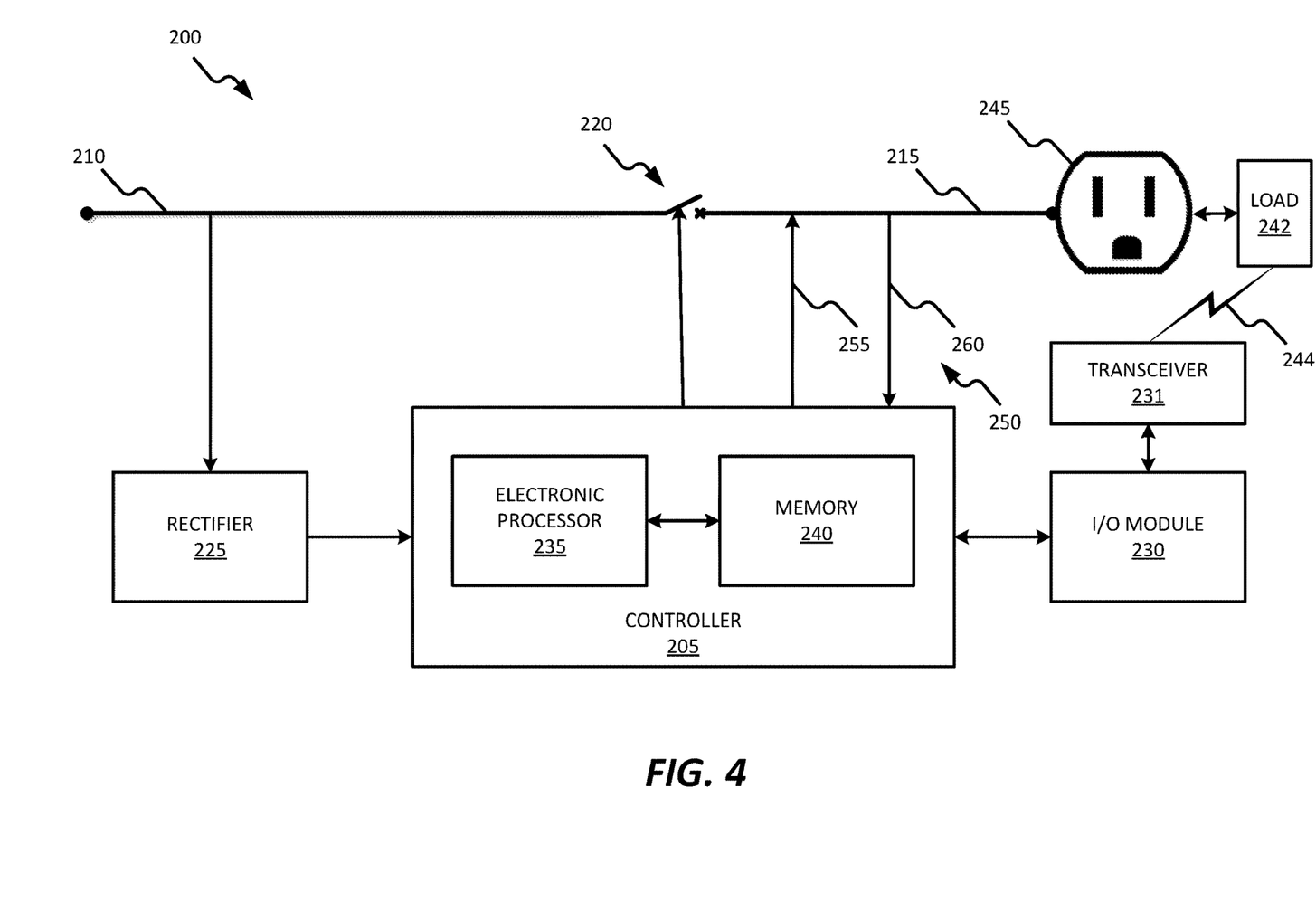
FIG. 4 is a block diagram of a testing circuit of the electrical receptacle of FIG. 1 according to some embodiments.

FIG. 3 is a side elevation view of a core assembly 80 according to some embodiments. Core assembly 80 includes a circuit board, such as a printed-circuit board (PCB), 82 that supports most of the working components of the receptacle 10, including the control system 200 (FIG. 4). Line contact arms 94, 96 pass through transformers 425, 430 with an insulating separator 97 there between. Line contact arms 94, 96 are cantilevered, their respective distal ends carrying phase and neutral line contacts 102, 104. Load contact arms 98, 100 are also cantilevered with their respective distal ends carrying phase and neutral load contacts 101, 103. The resiliency of the cantilevered contact arms biases the line contacts 102, 104 and load contacts 101, 103 away from each other. Load contact arms 98, 100 rest on a movable contact carriage 106, made of insulating (preferably thermoplastic) material.

FIG. 4 is a block diagram illustrating a control system, or circuit, 200. The control system 200 includes a controller 205. The controller 205 is electrically and/or communicatively connected to a variety of modules or components of the receptacle 10. For example, the controller 205 is connected to a line terminal 210, a load terminal 215, an interrupting device 220, a rectifier 225, an input/output (I/O) module 230, and a transceiver 231.

In some embodiments, the controller 205 includes a plurality of electrical and electronic components that provide power, operational control, and protection to the components and modules within the controller 205 and/or the receptacle 10. For example, the controller 205 includes, among other things, an electronic processor 235 (for example, a microprocessor or another suitable programmable device) and the memory 240.

The memory 240 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 235 is communicatively coupled to the memory 240 and executes software instructions that are stored in the memory 240, or stored on another non-transitory computer readable medium such as another memory or a disc. The software may include one or more applications, program data, filters, rules, one or more program modules, and other executable instructions.

The line terminal 210 is configured to receive a line power. The line terminal 210 is selectively electrically connected, via the interrupting device 220, to the load terminal 215. The load terminal 215 is configured to output the line power to an external load 242 electrically connected to an outlet 245.

The interrupting device 220 is configured to interrupt the flow of line power from the line terminal 210 to the load terminal 215. In some embodiments, the interrupting device 220 may include components of the core assembly 80, for example line contact arms 94, 96, transformers 425, 430, contacts 102, 104, load contact arms 98, 100, and contacts 101, 103.

Although illustrated as a single line terminal 210, a single load terminal 215, and a single interrupting device 220, in other embodiments, the receptacle 10 may include two or more individually functioning line terminals 210, load terminals 215, and interrupting devices 225. For example, a first line terminal, a first load terminal, and a first interrupting device may correspond to a first outlet of the receptacle 10, while a second line terminal, a second load terminal, and a second interrupting device may correspond to a second outlet of the receptacle 10.

The rectifier 225 is configured to rectify the line power to a nominal power for use by the controller 205. In some embodiments, the rectifier 225 rectifies alternating current (AC) power to a nominal direct current (DC) power.

The I/O module 230 is configured to receive input and to provide output to peripherals. The I/O module 230 obtains information and signals from, and provides information and signals to, (for example, over one or more wired and/or wireless connections) devices both internal and external to the receptacle 10. For example, the I/O module 230 is configured to provide communication between the receptacle 10 and outside devices (for example, other receptacles, electrical devices, external computers, smart phones, tablets, etc.). In such an embodiment, the receptacle 10 may communicate with the one or more outside devices through a network using, for example, the transceiver 231. The network is, for example, a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN).

The transceiver 231 is configured to enable wireless communication between the receptacle 10 and an external load 242, via, for example, wireless communication link 244. In other embodiments, rather than a transceiver 231, the receptacle 10 may include separate transmitting and receiving components, for example, a transmitter and a receiver. In operation, the electronic processor 235 is configured to control the transceiver 231 to transmit and receive data to and from the receptacle 10. The electronic processor 235 encodes and decodes digital data sent and received by the transceiver 231. The transceiver 231 transmits and receives radio signals to and from various wireless communication networks. The electronic processor 235 and the transceiver 231 may include various digital and analog components, which for brevity are not described herein and which may be implemented in hardware, software, or a combination of both. Some embodiments include separate transmitting and receiving components, for example, a transmitter and a receiver, instead of a combined transceiver 231.

In operation, the control circuit 200 may be in a standby mode or an operation mode. When in the standby mode, the interrupting device 220 electrically disconnects the line terminal 210 from the load terminal 215. Accordingly, in the standby mode, power is not provided to the outlet 245. When in the operation mode, the interrupting device 220 electrically connects the line terminal 210 to the load terminal 215. Accordingly, in the operation mode, power is provided to the outlet 245 and thus to the external load 242 electrically connected to the outlet 245.

In the illustrated embodiment, the control circuit 200 includes a feedback loop 250 configured to monitor the load terminal 215, and thus the external load 242 electrically connected to the outlet 245. The feedback loop 250 includes an output 255 and an input 260. In operation, the controller 205 outputs a test signal, via the output 255, to the load terminal 215. The controller 205 then receives a response signal, via the input 260, from the load terminal 215. The controller 205 analyzes the response signal to determine one or more characteristics (for example, a voltage, a current, a resistance, etc.) of external load 242 electrically connected to the outlet 245.

Figure 5:
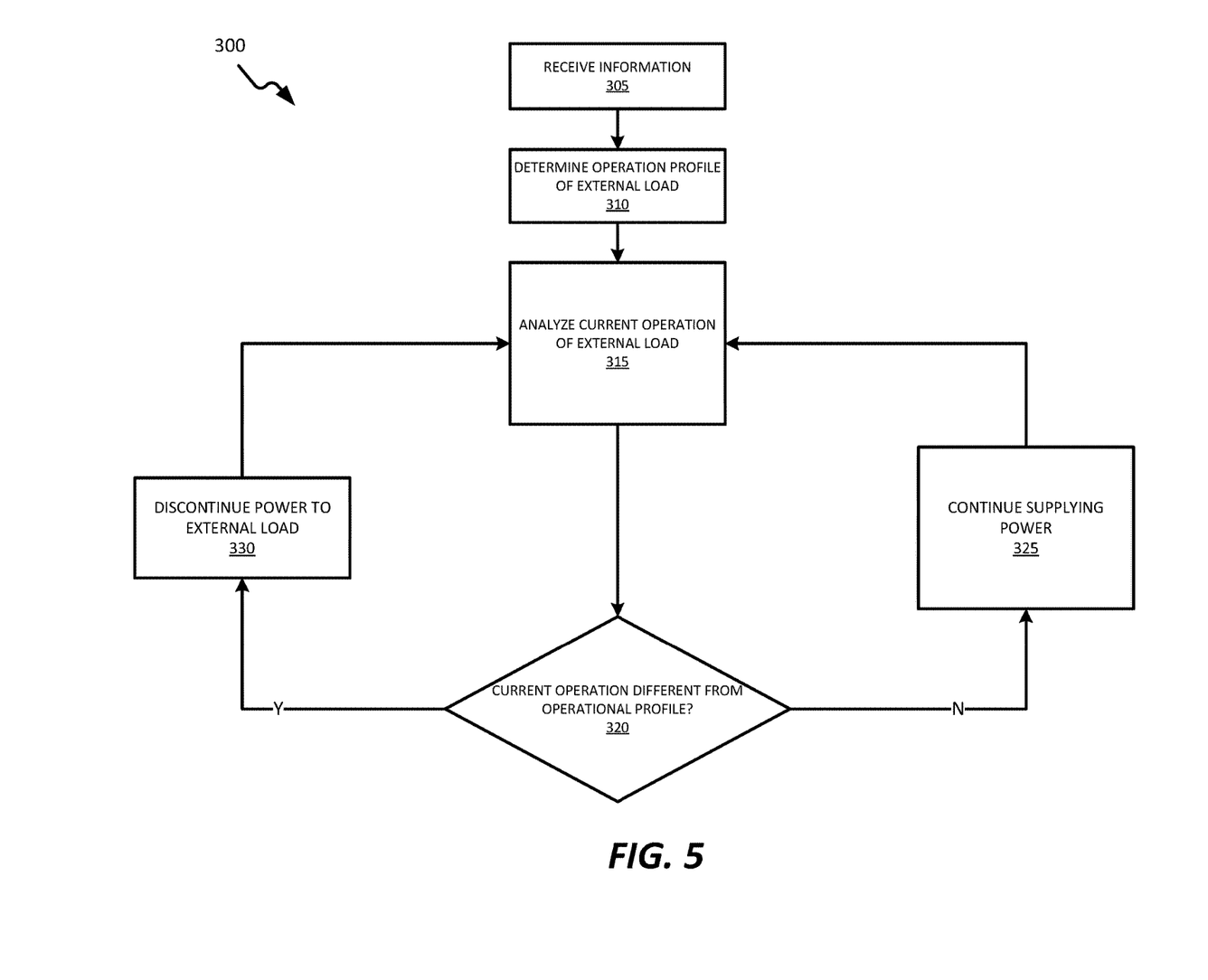
FIG. 5 is a flowchart illustrating an operation of the electrical receptacle of FIG. 1 according to some embodiments.

FIG. 5 illustrates a process, or operation, 300 of the receptacle 10 according to some embodiments. Operation 300 may be performed by control circuit 200 and/or controller 205. It should be understood that the order of the steps disclosed in operation 300 could vary. Although illustrated as occurring in parallel order, in other embodiments, the steps disclosed may be performed in serial order. Furthermore, additional steps may be added to the process and not all of the steps may be required.

At block 305, the controller 205 receives information from the external load 242. In some embodiments, the information may be received via the transceiver 231 and wireless communication link 244. In other embodiments, the information may be received via the feedback loop 250. In yet another embodiment, the information may be received via a combination of the transceiver 231 and the feedback loop 250. The information may be used to identify the particular external load 242. For example, the information could include the type of load or device, the manufacturer of the load, and/or the make/model of the load. In some embodiments, the information includes a unique identifier to discern the particular external load from other external loads of the same type, manufacturer, and/or make/model. In some embodiments, the information may also be, or include, one or more electrical characteristics of the external load 242.

The information may then be used to determine an operational profile of the external load 242 (block 310). The operational profile includes information related to the operation of the external load 242, for example, an operational history (including but not limited to, operational voltage, operational current, operational temperature, etc.). The operational profile may be stored in the memory 240 of the receptacle 10. In some embodiments, the operational profile is stored on a remote server. In such embodiments, the operational profile may be stored on a remote server, accessed via a home automation hub and/or the I/O module 230. The controller 205 may be configured to transfer an updated operational profile to the remote server to update an existing operational profile of the external load 242, or to store a new operational profile of the external load 242 on the remote server. In some embodiments, the information received from the external load 242 is, or includes, an operational profile of the external load 242.

A present operation of the external load 242 is analyzed (block 315). The present operation is analyzed based on one or more characteristics of, or information received from, the external load 242. For example, the characteristic of the external load 242 may include a time series of electrical characteristic data points, such as current draw over time. Additionally, the information received from the external load 242 may include data related to the present operation of the external load 242 (such as if the external load 242 is on standby (or sleep mode) or is in active use). In other embodiments, the present operation may be determined by the characteristics sensed by the feedback loop 250.

In some embodiments, the present operation is stored in memory 240 of the receptacle 10 or a remote server or database. In such embodiments, the present operation may be stored on a remote server through a home automation hub. The controller 205 may be configured to upload the present operation to update an existing operational profile or to create and store a new operational profile.

At block 320, the present operation is compared to the operational profile. When the present operation complies with the operational profile, the receptacle 10 continues to provide power to the external device (block 325) and operation 300 cycles back to block 315. When the present operation differs from the operational profile, the power to the external load 242 is discontinued (block 330). In some embodiments, to discontinue power, the interrupting device 220 is placed in standby mode and the line terminal 210 is electrically disconnected from the load terminal 215. In further embodiments, the controller 205 is configured to communicate with a circuit breaker, such as the one in which the receptacle 10 is drawing power through, and sends a command to the circuit breaker to shut off the breaker. In such an embodiment, operation 300 may include an additional block (not pictured), before block 330 to determine whether to discontinue power at the receptacle 10 and/or at the external circuit breaker. When power to the external load 242 is discontinued, a user may send a reset command via an outside device, (for example, a laptop, a computer, a smartphone, and/or tablet), or the RESET button 24 to provide power once again to the external load 242. In some embodiments, the controller 205 is further configured to override the reset command and maintain the receptacle 10 in standby mode.

In some embodiments, when power is incorrectly discontinued at the receptacle 10 (for example, an accidental trip), a user may send instructions to the receptacle 10 concerning the incorrect discontinuation. In such an embodiment, when instructions are sent, the operational profile that resulted in the incorrect discontinuation may be stored in memory (for example, memory 240 and/or remote server). Similar operational profiles may then be compared to the stored operation profile to avoid incorrect discontinuations of power in the future. In some embodiments, the user may send instructions to the receptacle 10 by pressing the RESET button 24 for a predetermined time period (for example, approximately five seconds).

In some embodiments, the receptacle 10 may be controlled by the outside device, via the I/O module 230. For example, a user, via the outside device (for example, a smartphone), may electrically connect/disconnect the line terminal 210 from the load terminal 215, regardless if the present operation complies with the operational profile or not. In further embodiments, the outside device may be a smoke detector or similar alarm device. In such an embodiment, the receptacle 10 may be controlled by the smoke detector or similar alarm device to determine when to discontinue power to the external load 242 and whether to discontinue power at the receptacle 10 or at the circuit breaker. In such an embodiment, the receptacle 10 is configured to shut down the circuit breaker in response to a signal from the smoke detector or similar alarm device.

Thus, the application provides, among other things, a system and method for determining when discontinue power to an external load electrically connected to a receptacle. Various features and advantages of the application are set forth in the following claims.

What is claimed is:
1. A receptacle comprising:
an electronic processor configured to:
  receive, via a feedback loop, information from an external load, wherein the feedback loop includes an output and an input, the feedback loop configured to:
    output, via the output, a test signal to a load terminal of the receptacle coupled to the external load, and
    receive, via the input, a response from the load terminal, the response corresponding to the information;
  determine, from the information, an operation profile of the external load;
  analyze a present operation of the external load; and
  discontinue power to the external load when the present operation of the external load differs from the operational profile.

2. The receptacle of claim 1 further comprising a transceiver.

3. The receptacle of claim 2, wherein the electronic processor is further configured to:
create or update the operation profile of the external load, creating an updated operational profile; and
transfer the updated operational profile to a remote server.

4. The receptacle of claim 2, wherein the electronic processor is further configured to communicate, via the transceiver, with a circuit breaker and shut down the circuit breaker in response to the present operation of the external load being different from the operational profile.

5. The receptacle of claim 4, wherein the electronic processor is further configured to determine whether to discontinue power to the external load at the circuit interrupting receptacle or at the circuit breaker.

6. The receptacle of claim 2, wherein the electronic processor is further configured to override a reset command.

7. The receptacle of claim 2, wherein the electronic processor is further configured to communicate, via the transceiver, with a smoke detector and shut down a circuit breaker in response to a signal from the smoke detector.

8. The receptacle of claim 1, wherein the operation profile is based on an operational history of the external device.

9. A method of operating a receptacle comprising:
receiving, via a feedback loop at an electronic processor, information from an external load, wherein the feedback loop includes an output and an input, the feedback loop configured to:
output, via the output, a test signal to a load terminal of the receptacle coupled to the external load, and
receive, via the input, a response from the load terminal, the response corresponding to the information;
determining, from the information, an operation profile of the external load;
analyzing, with the electronic processor, a present operation of the external load; and
discontinuing power to the external load when the present operation of the external load differs from the operational profile.

10. The method of claim 9 further comprising:
creating or updating the operation profile of the external load, creating an updated operational profile; and
transferring the updated operational profile to a remote server.

11. The method of claim 9 further comprising shutting down a circuit breaker in response to the present operation of the external load being different from the operational profile.

12. The method of claim 9 further comprising determining whether to discontinue power to the external load at the circuit interrupting receptacle or at the circuit breaker.

13. The method of claim 9 further comprising overriding a reset command.

14. The method of claim 9 further comprising shutting down a circuit breaker in response to a signal from a smoke detector.

15. The method of claim 9 wherein the operation profile is based on an operational history of the external device.

* * * * *